(12) United States Patent
Bloch

(10) Patent No.: US 10,631,599 B2
(45) Date of Patent: *Apr. 28, 2020

(54) KNIFE AND ASSOCIATED SHEATH

(71) Applicant: Outdoor Edge Cutlery Corporation, Denver, CO (US)

(72) Inventor: David R. Bloch, Morrison, CO (US)

(73) Assignee: OUTDOOR EDGE CUTLERY CORPORATION, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,816

(22) Filed: Jan. 8, 2019

(65) Prior Publication Data

US 2019/0381679 A1      Dec. 19, 2019

Related U.S. Application Data

(63) Continuation of application No. 16/007,899, filed on Jun. 13, 2018, now Pat. No. 10,512,315, which is a
(Continued)

(51) Int. Cl.
| | |
|---|---|
| *B26B 11/00* | (2006.01) |
| *B26B 29/02* | (2006.01) |
| *A44C 5/00* | (2006.01) |
| *F23Q 1/06* | (2006.01) |
| *G01C 17/02* | (2006.01) |
| *A44C 5/20* | (2006.01) |
| *A44C 15/00* | (2006.01) |
| *A45D 29/04* | (2006.01) |
| *B67B 7/00* | (2006.01) |

(Continued)

(52) U.S. Cl.
CPC ............ *A44C 5/003* (2013.01); *A44C 5/0007* (2013.01); *A44C 5/0061* (2013.01); *A44C 5/2076* (2013.01); *A44C 15/0015* (2013.01); *A45D 29/04* (2013.01); *B26B 11/00* (2013.01); *B26B 11/008* (2013.01); *B26B 29/025* (2013.01); *B67B 7/00* (2013.01); *F23Q 1/06* (2013.01); *G01C 17/02* (2013.01); *G04B 37/0008* (2013.01); *G04B 47/00* (2013.01); *G06K 19/0723* (2013.01); *A41F 9/002* (2013.01)

(58) Field of Classification Search
CPC ......... A44C 5/0007; A44C 5/003; B26B 3/00; B26B 3/06; B26B 29/02; B26B 29/025; B26B 29/00; B26B 29/04
USPC ............. 63/1.12; 224/232; 30/151, 162, 164
See application file for complete search history.

(56) References Cited

U.S. PATENT DOCUMENTS

| | | | | |
|---|---|---|---|---|
| 675,118 A | * | 5/1901 | Sweet | ................... B26B 29/025 |
| | | | | 224/232 |
| 2,527,710 A | * | 10/1950 | Davidson, Jr. | ........ B26B 29/025 |
| | | | | 224/232 |

(Continued)

*Primary Examiner* — Jack W Lavinder
(74) *Attorney, Agent, or Firm* — FisherBroyles, LLP; Craig W. Mueller

(57) ABSTRACT

A bracelet or flexible band comprised of a flexible member that on one end is interconnected to a knife and on another end, is connected to a sheath that selectively receives the knife in the locking fashion. When needed, the knife is rotated within the sheath to facilitate release thereof from a lock that is integral with the sheath. Once removed from the sheath, the knife can be used for self-defense, cutting rope or cord in an emergency situation, or for general utility cutting tasks.

20 Claims, 12 Drawing Sheets

Related U.S. Application Data continuation of application No. 15/605,410, filed on May 25, 2017, now Pat. No. 9,999,279.

(60) Provisional application No. 62/341,913, filed on May 26, 2016.

(51) Int. Cl.
*G04B 37/00* (2006.01)
*G04B 47/00* (2006.01)
*G06K 19/07* (2006.01)
*A41F 9/00* (2006.01)

(56) References Cited

U.S. PATENT DOCUMENTS

| | | | | |
|---|---|---|---|---|
| 4,835,863 A * | 6/1989 | Salandre | ............... | B26B 29/025 224/232 |
| 5,002,213 A * | 3/1991 | Newton | ............... | A45F 5/14 224/232 |
| 9,033,148 B2 * | 5/2015 | Adams | ............... | A45F 5/14 206/349 |
| 2013/0026054 A1 * | 1/2013 | Adams | ............... | A45F 5/14 206/349 |

* cited by examiner

KNIFE AND ASSOCIATED SHEATH

This application is a continuation of U.S. patent application Ser. No. 16/007,899, filed Jun. 13, 2018, which is a continuation of U.S. patent application Ser. No. 15/605,410, filed May 25, 2017, now U.S. Pat. No. 9,999,279, issued Jun. 19, 2018, which claims the benefit of U.S. Provisional Patent Application Ser. No. 62/341,913, filed May 26, 2016, the entireties of which are incorporated by reference herein.

FIELD OF THE INVENTION

Embodiments of the present invention generally relate to a bracelet comprising a first end and a second end interconnected by a knife selectively enclosed within a sheath to form a closed loop.

BACKGROUND OF THE INVENTION

It is often advantageous to carry a knife to perform everyday tasks, to cut a seatbelt or a tangled line in an emergency, or for self-defense. One problem with most knives is that they must be stored in pockets, handbags, or in a sheath worn on a belt, which can be cumbersome and unsightly. It can also be time consuming to draw a knife from a pocket, handbag, or sheath, especially in a stressful or emergency situation. One example of an emergency is a car accident, wherein the seatbelt will not release and a cutting implement is needed to cut the seatbelt to allow vehicle extrication. It is easy to envision in this situation, it may be difficult or impossible for one to access a pocket or handbag to retrieve a knife to cut the seatbelt and free themselves. Further, in a self-defense situation, the extra time it takes to retrieve a knife from a pocket or handbag could result in serious injury or death. If a person is in a struggle, accessing a knife from a pocket or handbag may be difficult or impossible.

It is, thus, a long-felt need to provide an accessible knife that can be quickly and easily deployed that need not fit into a pocket, on a belt, or in a handbag. The knives contemplated by embodiments of the present invention may be worn about one's wrist, ankle, or waist and, thus, can be quickly and easily deployed any time if needed in an emergency, for self-defense, or when the need arises to cut a rope or cord, open a box, or open a letter, etc.

SUMMARY OF THE INVENTION

It is one aspect of some embodiments of the present invention to provide a knife comprising the blade extending from a blade base that supports the blade and functions as a small handle portion. The blade base and handle may be an integral unit, i.e., a skeleton knife. The blade base is also operatively interconnected to one end of a flexible band or strap. The other end of the knife is selectively interconnected to a sheath that selectively receives the blade. The opposite end of the sheath may be either permanently fixed or selectively interconnected to an opposite end of the flexible band by way of a clasp and hasp, a loop and T-post connection, a hook and eye, or with a magnetic/ferromagnetic interaction. How the sheath interconnects to the flexible band increases safety as the blade is enclosed in the sheath before the flexible band is wrapped around the wrist. Without this connection scheme, the knife must be inserted into the sheath to attach to the bracelet to one's wrist, which could cause serious injury as the sharp knife blade must be placed near the user's wrist to affect bracelet closure.

As mentioned above, the knife blade extends from a base, which in one embodiment includes a protective handle guard extending therefrom. A top surface of the blade and/or blade base may include a curved or ramped thumb grip with serrations to provide a substantially non-slip gripping surface (also known in the art as "jimping"). Because at least a portion of the flexible band functions as a portion of the knife handle, upward force on the blade's cutting edge can cause the band to flex and the blade to rotate backward, which can cause ineffective cutting force. Gripping areas on the blade and/or the blade base acts as a purchase area that receives the user's thumb or forefinger to prevent upward rotation of the blade; and allows the short blade base and flexible band to effectively function as a rigid knife handle.

The knife, sheath, and band form a bracelet, which may be circular, when the knife is inserted into the sheath. When the knife is positioned within the sheath, it is locked such that the knife or sheath must be moved in a specific fashion to release the knife. That is, the sheath of some embodiments of the present invention includes a positive locking mechanism that secures the knife within the sheath. The positive locking mechanism improves safety and prevents loss because the knife is secured and accidental or unintended release is eliminated. Release of the positive locking mechanism of some embodiments requires opposing forces acting on the sheath and the blade base and/or flexible band. One force is transferred from the thumb or forefinger to press down on the top of the sheath. The second force is generated by the thumb or forefinger in an opposing direction to the first force, which urges the blade base along an outer surface associated with the sheath opening (which may be arcuate) and eventually allows for removal of the knife. As knife removal requires opposing forces be applied in a specific fashion to both the top of the sheath and the blade base or flexible band, unintended or accidental release of the knife is drastically reduced or eliminated; even in a hand-to-hand struggle when an attacker applies pulling or twisting forces directly to the bracelet or to the wearer's wrist in close proximity to the bracelet.

The positive lock of one embodiment of the present invention comprises a detent that captures the handle guard extending from the blade base. The handle guard increases safety and helps avoid injury by preventing the user's fingers from sliding past the blade base and onto the blade edge. The handle guard has a portion that engages the deflectable detent that is selectively interconnected to the sheath by way of a flexible arm. When relaxed, the detent is near the sheath, which traps the handle guard between the open end of the sheath and a stop on the detent. The deflectable arm is urged away from the sheath when the blade base is rotated within a plane corresponding to the outer surface of the sheath. Such movement will urge the handle guard against the detent, thereby deflecting the arm and biasing the detent away from the sheath which allows the knife to be removed. The detent may include a socket that forms a seat that snugly receives a bulged portion of the handle guard when the knife is within the sheath. This feature helps ensure the knife stays within the sheath when the lock is in place, i.e., when the detent is released.

As mentioned above, the knife is released from the sheath by movement of the knife within the sheath in a specific fashion. The sheath has an internal volume with a ceiling and a floor. A gap is provided between the knife's cutting edge and the floor of the sheath when the knife is within the sheath. The gap allows the knife to be rotated within the sheath and the blade base relative to the sheath, which urges the handle guard against the detent to deflect the arm and facilitate movement of the bulge from the socket. To facilitate rotation of the blade within the sheath, the blade may be shaped to provide a pivot point that selectively engages the sheath ceiling. A bottom surface of the sheath may be non-continuous or the arm may have a groove that receives the blade tip to facilitate blade rotation and release.

It is still yet another aspect of some embodiments of the present invention to provide a flexible wristband made of flexible, resilient material. In one embodiment, the wristband is formed of braided paracord. Other embodiments of the present invention employ a metal bracelet, commonly found on many watches; or a rubber band, found on many dive watches. One of ordinary skill in the art will appreciate the flexible band need not be associated with a user's wrist. More specifically, in one embodiment of the present invention the flexible portion interconnected to the knife and sheath is a belt, wherein the knife and sheath form a belt buckle or a secondary belt clasp. In operation, a user simply moves a knife relative to the sheath to release the knife and open the belt. The end of the flexible band is interconnected to a T-post or hook extending from the sheath. One of ordinary skill in the art will appreciate there are other ways to interconnect the ends of the flexible band to the knife and sheath without departing from the scope of the invention.

The wristband may be made of any material such as paracord, a stretch elastic material, stainless steel, Kevlar, rubber metal, or carbon fiber. The wristband can be made of a bi-stable spring that selectively stiffens, i.e., the material of a slap bracelet. In one embodiment of the present invention, the blade of one embodiment is made of stainless steel (e.g., 8Cr13MoV). And, in one embodiment of the present invention, the blade is a 1.5-inch hawk-bill blade, but any blade may be used such as a drop point blade. The sheath and blade base may be made of glass/nylon polymer or any other suitable plastic.

As one of ordinary skill in the art will appreciate, the component fit within the sheath need not be a knife. For example, some embodiments of the present invention employ a can opener, a flashlight, a flint, an RFID device, a key, a USB device, a fingernail file, a multi-tool, a compass, a pen, a computer memory device, a whistle, an energy storage device, or oil, wax, liquid, or other common material that can be vaporized or atomized (e.g., smoking oil). In this later example, the bracelet could function as a smoking device, wherein the sheath or component that fits into the sheath accommodates a heating device. The opposite end of the bracelet would comprise a device that selectively fits within a user's mouth, wherein he or she would draw vaporized smoking products similar to a ("vape pen"). The smoking product could be stored in oil form in at least one end of the bracelet or in a flexible tube incorporated into the flexible portion of the bracelet. In one embodiment of the present invention, the item associated with the blade base are selectively interchangeable. For example, the knife can be removed such that the blade base can receive USB storage device. Removeability of the knife also allows it to be replaced when it becomes dull.

Further, the sheath (or component received therein) may include additional functionality/features, such as a compass, a watch, an RFID device, or other wireless data transferring devices that allow individuals to unlock doors, pay for merchandise, transmit their identity or vital statistics. In some other embodiments, the sheath includes components that allow it to communicate with a cellular phone or other device via wireless communication means such as Wi-Fi or Bluetooth. That is, the sheath may include a screen and electronic components and function somewhat like an Apple Watch. The flexible portion of the bracelet may also accommodate a wristwatch, wherein the clasp can be separated to reveal the knife. Those of ordinary skill in the art will appreciate that some embodiments may function as a heart rate monitor or fitness tracker.

It is, thus, one aspect of some embodiments of the present invention to provide a bracelet with in integrated knife, comprising: a sheath having a first end and a second open end; a knife comprised of a blade extending from a blade base, the blade base having a first end for interconnection to the blade and a second end, the blade base also having a handle guard extending therefrom; a flexible band having a first end operatively interconnected to the first end of the sheath, and a second end operatively interconnected to the second end of the blade base; wherein the sheath includes a selectively deflectable arm that ends in a detent positioned adjacent the second open end of the sheath; and wherein the detent has a first position of use where the handle guard is positioned between the second open end of the sheath and the detent, and a second position of use where the detent is deflected such that the handle guard is free to move away from the second open end of the sheath.

It is another aspect of some embodiments to provide a bracelet with an integrated device, comprising: a sheath having a first end and a second open end; a device comprised of a first end configured to selectively fit within the sheath, and a second end with a protrusion extending therefrom; a flexible band having a first end operatively interconnected to the first end of the sheath, and a second end operatively interconnected to the second end of the second end of the device; wherein the sheath includes a selectively deflectable arm that ends in a retaining member positioned adjacent the second open end of the sheath; and wherein the retaining member has a first position of use where the protrusion is positioned between the second open end of the sheath and the retaining member, and a second position of use where the retaining member is deflected such that the device is free to move from of the sheath.

It is still yet another aspect of some embodiments of the present invention to provide a sheath, comprising: a first surface; a second surface spaced from the first surface; a third surface interconnecting the first surface and the second surface; a fourth surface interconnecting the first surface and the second surface; wherein the first surface, the second surface, the third surface, and the fourth surface define an internal volume; an arm deflectably attached to the fourth surface; and a detent interconnected to an end of the arm, the detent adapted to selectively engage a portion of a device that is adapted to fit within the volume to lock the device within the sheath.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 17 is a rear perspective view of a knife and associated sheath of another embodiment of the present invention that employs a flint and a whistle;

Figure 1:
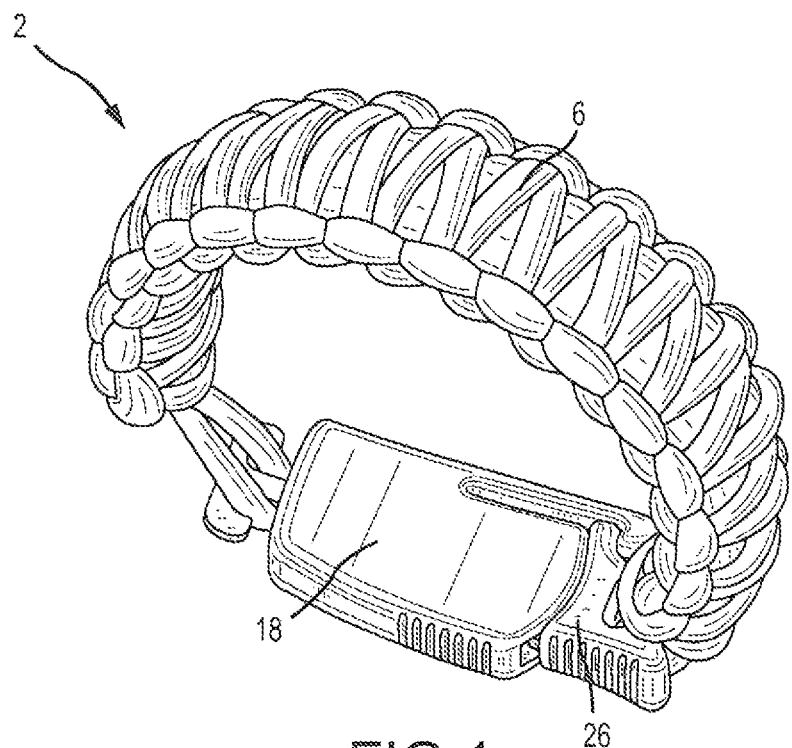
FIG. 1 is a perspective view of a bracelet of one embodiment of the present invention.

To assist in the understanding of one embodiment of the present invention the following list of components and associated numbering found in the drawings is provided herein:

| No. | Component. |
| --- | --- |
| 2 | Bracelet |
| 6 | Flexible band |
| 10 | Flexible band first end |
| 14 | Flexible band second end |
| 18 | Sheath |
| 22 | Knife |
| 26 | Blade base |
| 28 | Handle |
| 30 | Handle guard |
| 34 | Detent |
| 36 | Socket |
| 38 | Outer surface |
| 42 | Sheath first end |
| 46 | Hook |
| 50 | Sheath second, open end |
| 54 | Blade |
| 58 | Upper edge |
| 62 | Ceiling |
| 66 | Floor |
| 70 | Tip |
| 74 | Arm |
| 82 | Apex |
| 86 | Loop |
| 90 | Handle guard end |
| 94 | Bulge |
| 98 | Nose |
| 102 | Upper surface |
| 106 | Lower surface |
| 110 | Watch |
| 114 | Flint |
| 118 | Whistle |

The drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-7 show a bracelet 2 of one embodiment of the present invention. The bracelet 2 comprises a flexible band 6 having a first end 10 and a second end 14. The first end 10 of the flexible band 6 is interconnected to a sheath 18 and the second end 14 is interconnected to a knife 22. The flexible band 6 of one embodiment of the present invention is formed of braided paracord. However, those of ordinary skill in the art will appreciate that other flexible bands, straps, bow strap, or harness may be employed without departing from the scope of the invention.

Figure 2:
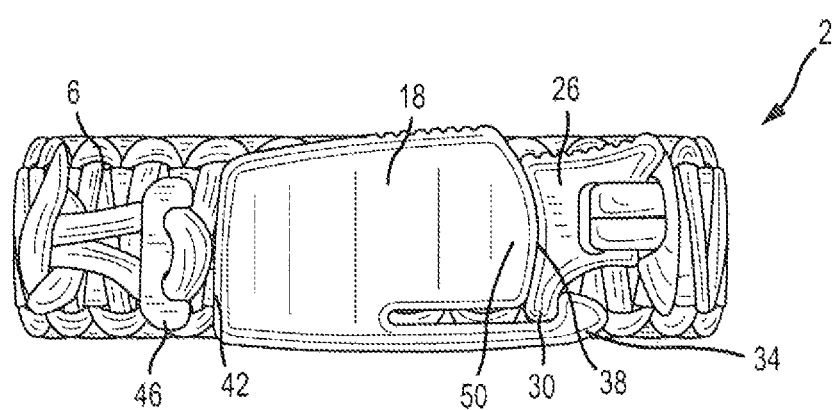
FIG. 2 is a bottom plan view of the bracelet.
Figure 3:
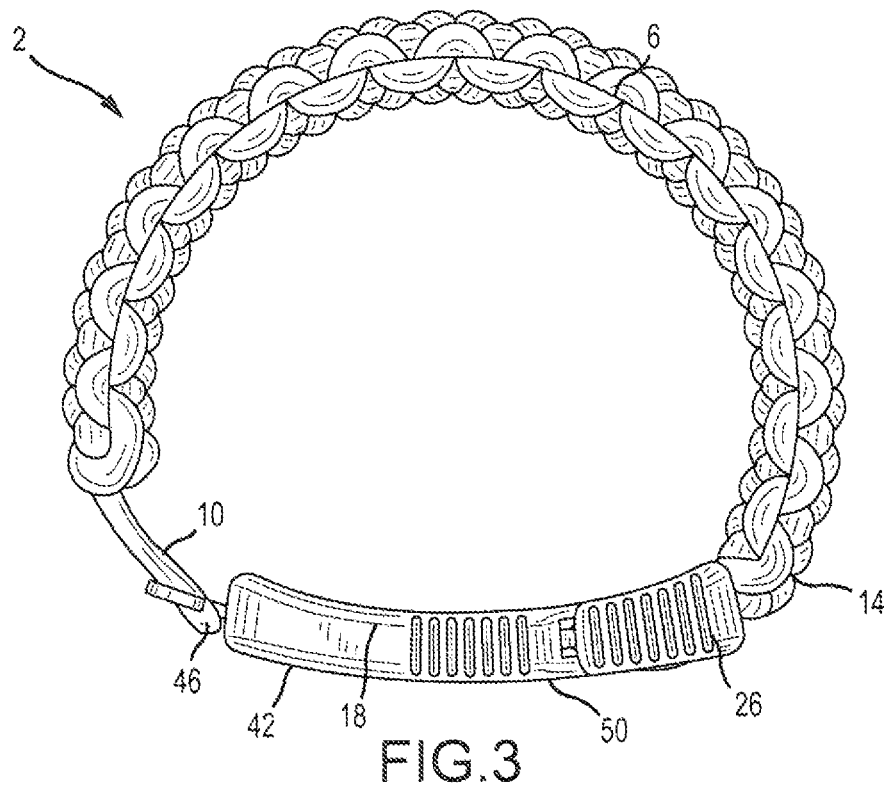
FIG. 3 is a front elevation view of the bracelet.

The knife 22 when positioned within the sheath as shown in FIGS. 1-3, forms an article adapted to fit around a user's wrist, ankle, or waist; or be incorporated into any strap, such as a bow strap. A bracelet 2 is provided in the figures provided herein. The clasp of the bracelet comprises the sheath 18 that selectively receives the knife 22. The knife 22 can cut items for everyday utility, in an emergency, or be used for self-defense.

Figure 3A:
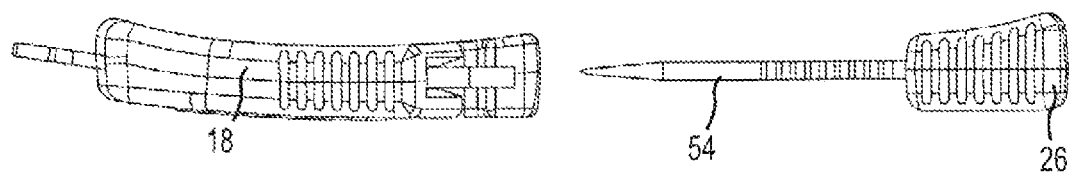
FIG. 3A is front elevation view showing a knife removed from a sheath.

As shown in FIGS. 1-4, the knife 22 includes a blade 54 interconnected to a blade base 26. The blade base 26 and a portion of the flexible band 6 define a handle 28 interconnected to the blade. The blade base 26 includes a handle guard 30 selectively locked by a movable detent 34 associated with the sheath. A socket 36 of the detent 34 and an outer surface 38 of the sheath trap the handle guard to lock the blade within the sheath. The sheath 18 has a first end 42 which may have a hook 46, or another device, for selective receipt of the first end of the flexible band 6. A second end 14 of the flexible band is tied or otherwise interconnected to the blade base 26. The sheath 18 may have a curved inner surface, i.e., the surface configured to contact the user's body, and the blade base 26 may have a complementary arcuate surface (see also, FIG. 3A). The curved surface or surfaces enhance user comfort and ergonomics. Further, these surfaces may incorporate a cushion to increase comfort.

Figure 4:
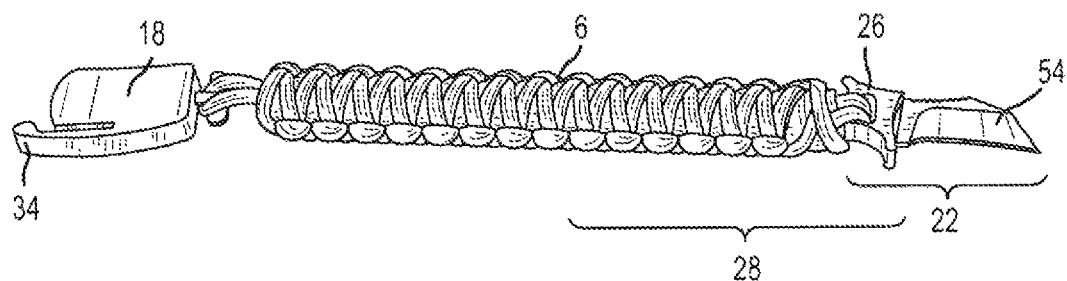
FIG. 4 is a perspective view of the bracelet in a second, open position of use wherein a blade has been removed from the sheath.
Figure 5:
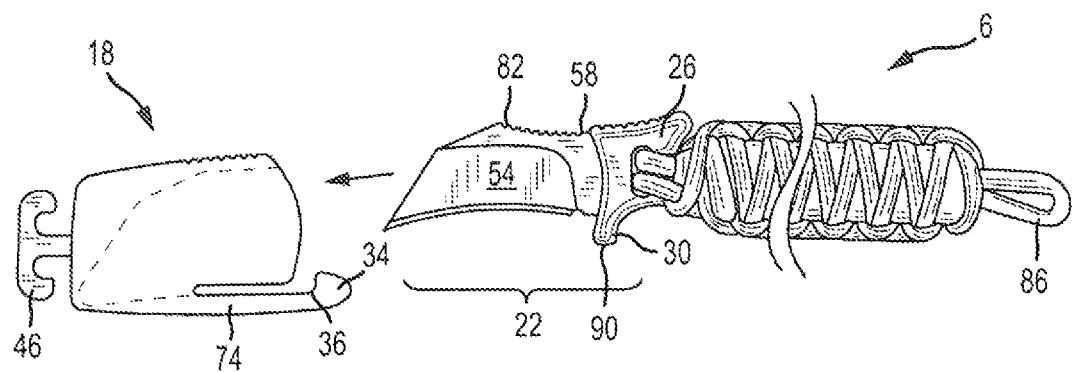
FIG. 5 is a partial cross-sectional front elevation view showing the knife removed from the sheath.

FIGS. 4 and 5 show the bracelet 2 in an open configuration. Here, the knife 22, which comprises a blade 54 and the blade base 26, has been removed from the sheath 18, thereby allowing the flexible band to elongate. The handle guard 30 protects the user's fingers from sliding past the blade base and unintended contact with the blade 54 and cutting edge. The blade base 26 and the blade 54 may also include a knurled upper edge 58 that enhances gripping and serves as a surface for user's thumb or forefinger to press downward on the blade 54 to prevents upward rotation of the blade that may result from band flex.

Figure 6:
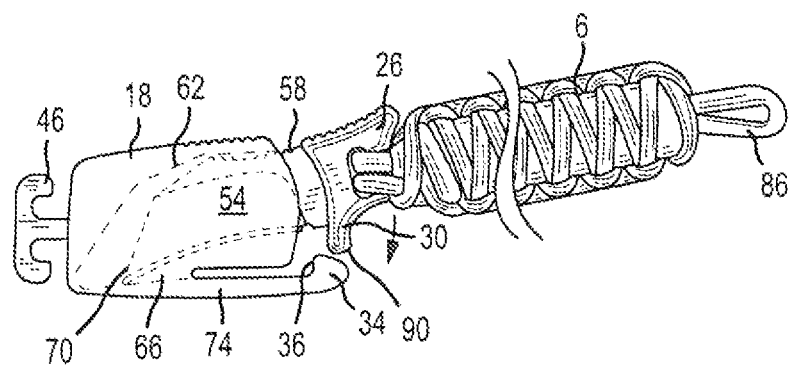
FIG. 6 is a partial cross-sectional front elevation view showing the interaction between the knife and sheath as the knife is initially positioned within the sheath with the handle guard clear of a locking detent.
Figure 7:
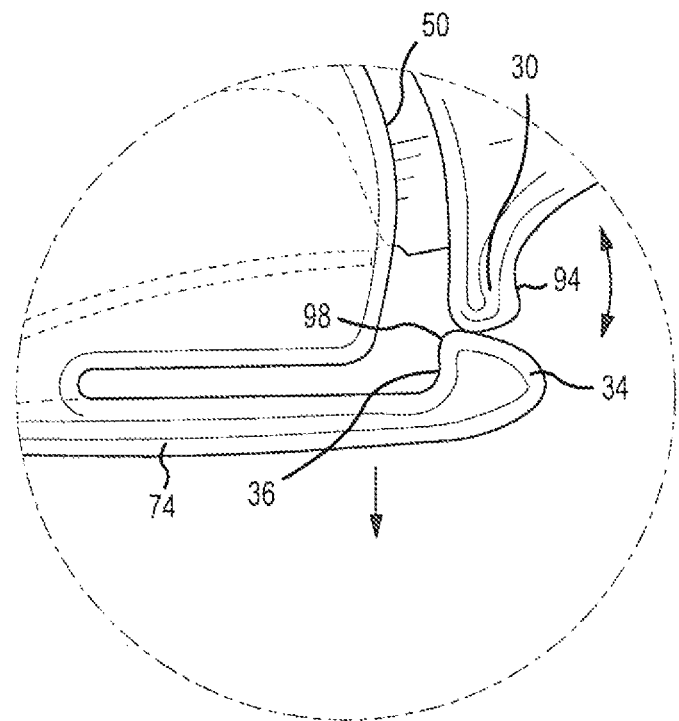
FIG. 7 is a detailed view showing the interaction between the handle guard and the positive locking detent.
Figure 8:
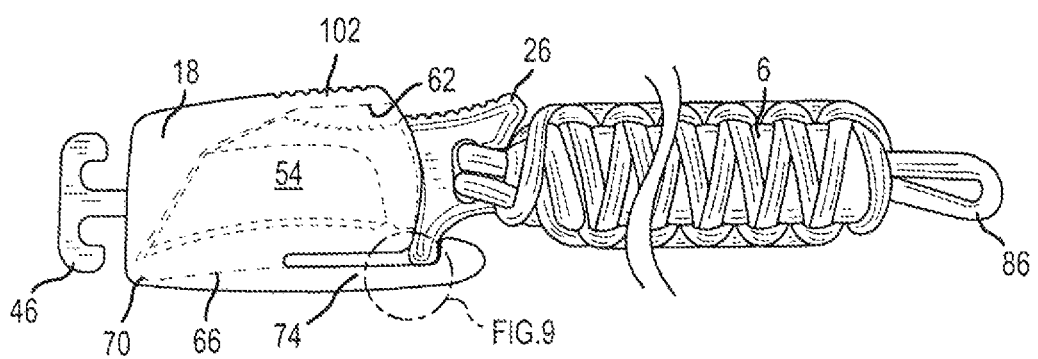
FIG. 8 is a front elevation view showing the blade positioned within the sheath and in the locked position.
Figure 9:
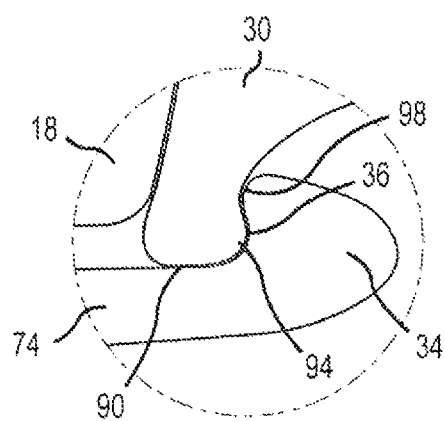
FIG. 9 is a detailed view of FIG. 8.
Figure 10:
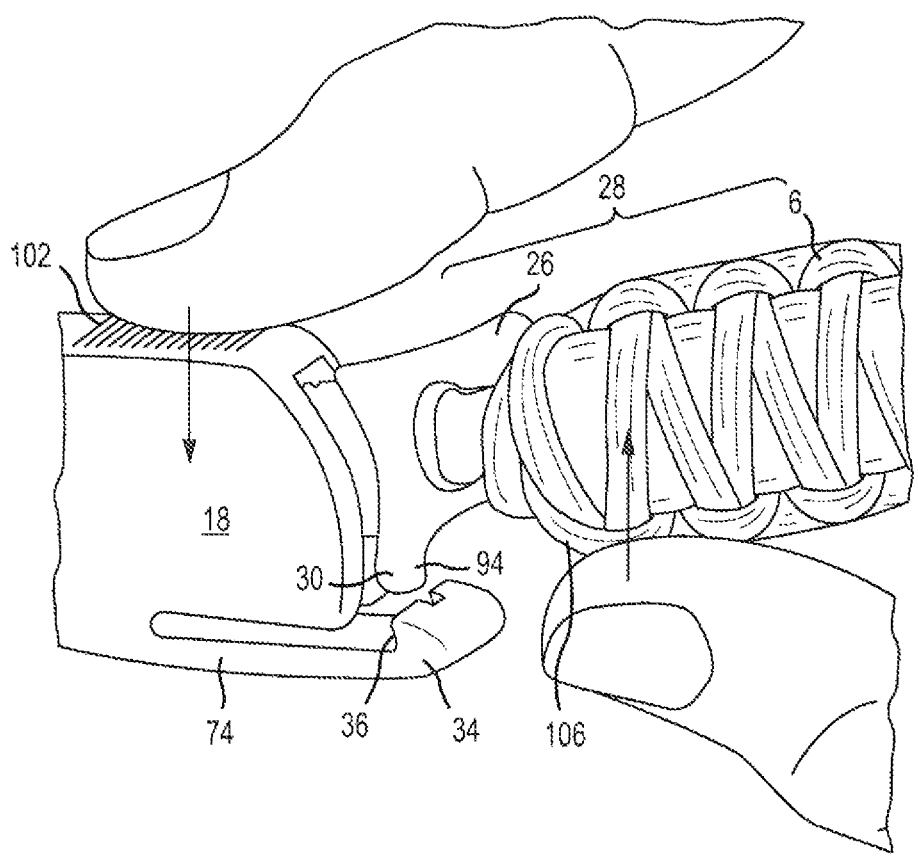
FIG. 10 is a perspective view illustrating how knife release is initiated.
Figure 11:
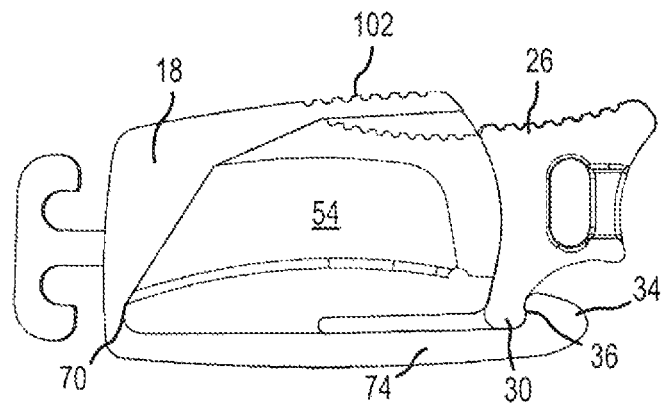
FIG. 11 is a front elevation view showing the knife seated in the sheath and positively locked, a portion of the sheath is shown transparent.
Figure 12:
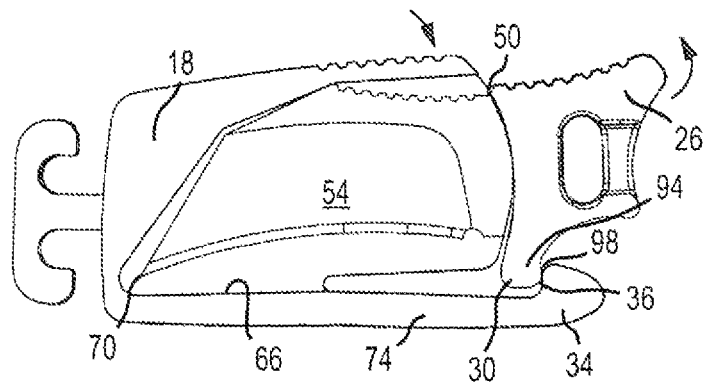
FIG. 12 is a front elevation view showing the knife at an initial phase of removal from the sheath, wherein an arm is fully deflected, a portion of the sheath is shown transparent.
Figure 13:
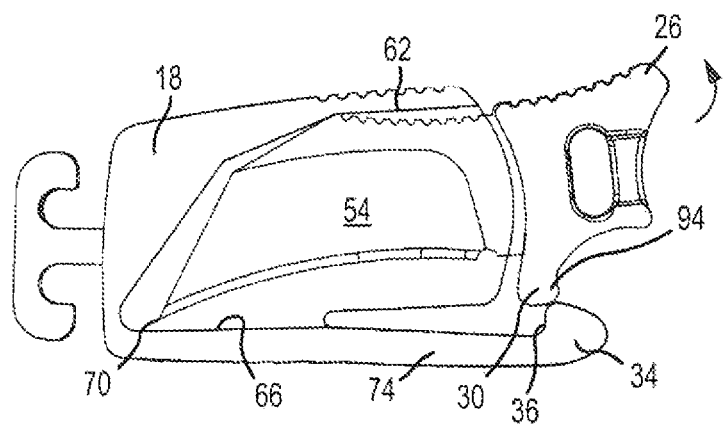
FIG. 13 is a front elevation view showing the knife at an intermediate phase of removal from the sheath, wherein the arm is deflected and the bulge on the handle guard has cleared the nose on the detent, a portion of the sheath is shown transparent.

FIGS. 6-9 illustrate how the knife is locked within the sheath. The sheath 18 includes a ceiling 62 and a floor 66, wherein a blade tip 70 is spaced from the floor 66 when the knife is fully inserted within the sheath 18. As the blade 54 is initially inserted within the sheath, as shown in FIG. 6, the handle guard 30 is spaced from the detent 34. Further insertion of the blade 54 into the sheath 18 will cause the end 90 of the handle guard to come into close proximity or engage the detent as shown in FIG. 7. Still further blade insertion will engage a bulge 94 of the handle guard 30 onto a nose of the detent 98, thereby flexing the arm 74 and moving the detent 34. The final locking step is performed by rotating the knife base 26 downwardly along the second, open end of the sheath 50, which positions the handle guard 30 between the second end of the sheath 50 and the detent 34, wherein the bulge 94 is firmly seated in a socket 36 provided by the detent. FIGS. 8 and 9 show the final locking configuration, wherein arm 74 has relaxed and the detent 34 is positioned such that the bulge 94 is firmly seated in the socket 36.

Figure 14:
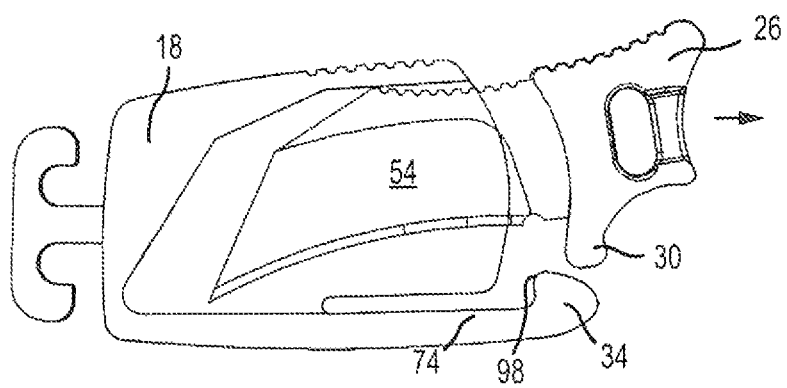
FIG. 14 is front elevation view showing the knife at a final stage of removal from the sheath, wherein the arm is in a relaxed, un-deflected position, a portion of the sheath is shown transparent.

FIGS. 10-14 show how the blade 54 is released from the sheath 18. More specifically, to remove the knife 22 from the sheath 18, the user presses on the upper surface 102 of the sheath and provides an opposing force to a lower surface 106 of the blade base 26 and an adjacent portion of the flexible band 6. These opposing forces (see opposing arrows on FIG. 12) cause the blade 54 to rotate within the sheath 18 and moves the tip 70 closer to the floor 66 of the sheath 18. This rotation also moves the handle guard 30 along the second, open end of the sheath 50 and, thus, moves the handle guard 30 out of the socket 36 provided by the detent 34. During this phase, the bulge 94 will engage the nose 98 which flexes the arm 74 and allows further movement of the handle guard 30 and blade base 26 from the sheath 18. That is, movement of the blade base 26 relative to the sheath 18 as shown will eventually allow the handle guard 30 to escape the detent 34, wherein the handle guard 30 is spaced from the detent 34 as shown in FIG. 14. The blade 54 may be hawk-bill, drop point, or other shape to provide an apex 82 at the upper edge thereof that selectively engages a point on the ceiling 62 to facilitate rotation of the knife within the sheath. In one embodiment, this blade release sequence generates an audible noise, such as a "pop."

Figure 15:
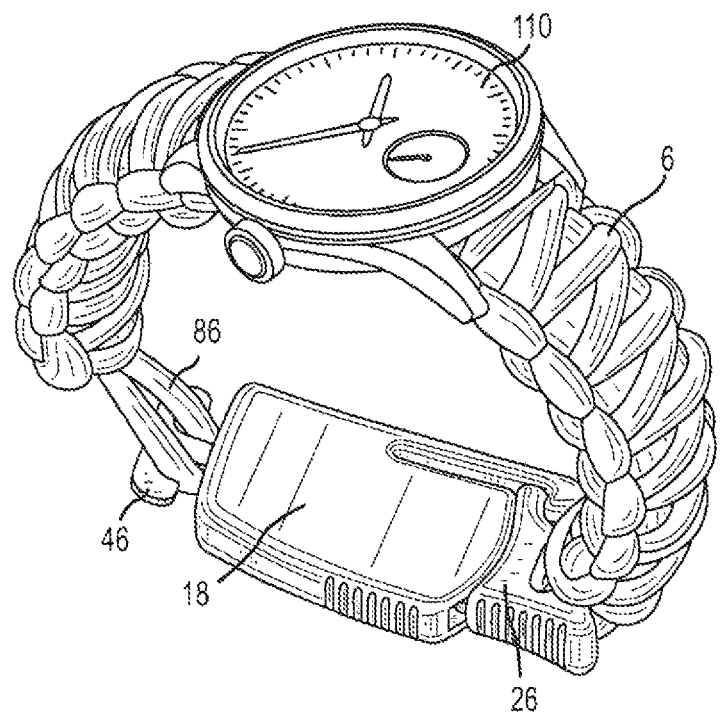
FIG. 15 is a perspective view of a bracelet of another embodiment of the present invention that incorporates a watch.
Figure 16:
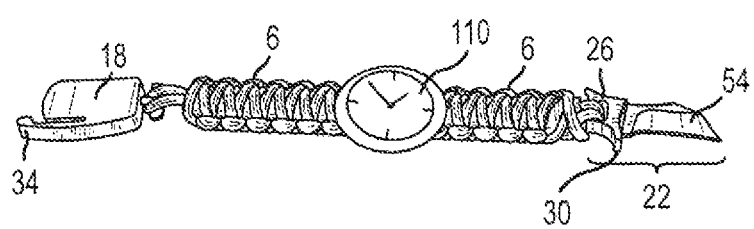
FIG. 16 is a top perspective view of the combination watch and bracelet shown in FIG. 15.
Figure 13:
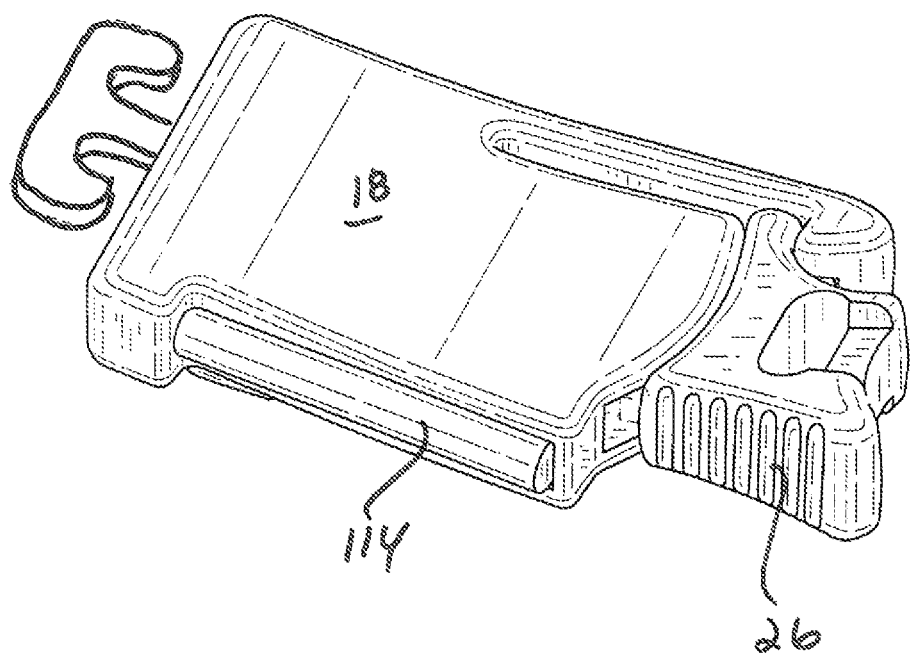
Figure 18:
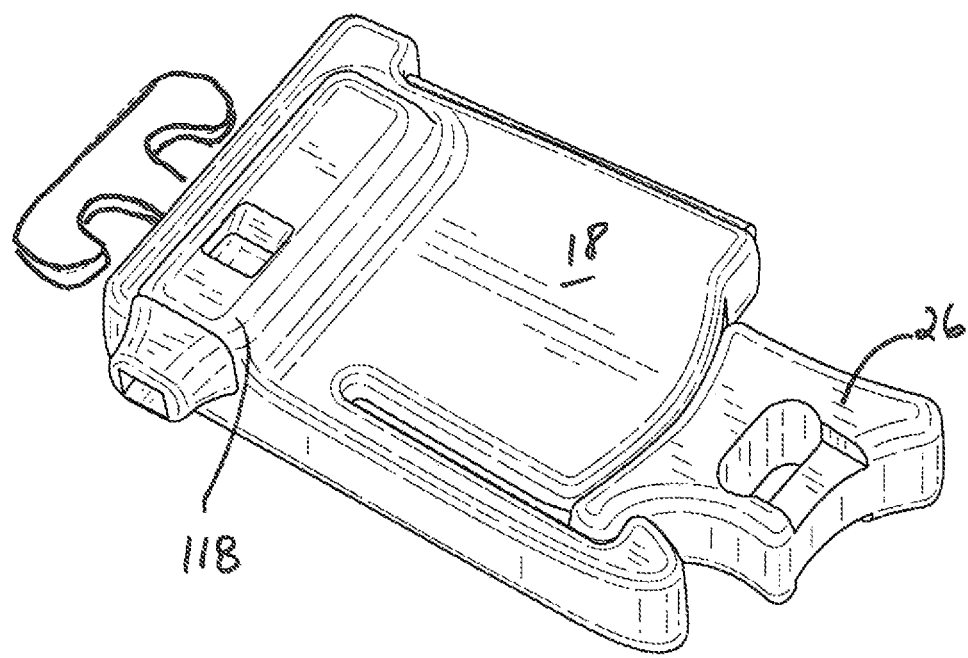
FIG. 18 is a front perspective of the embodiment shown in FIG. 17.
Figure 19:
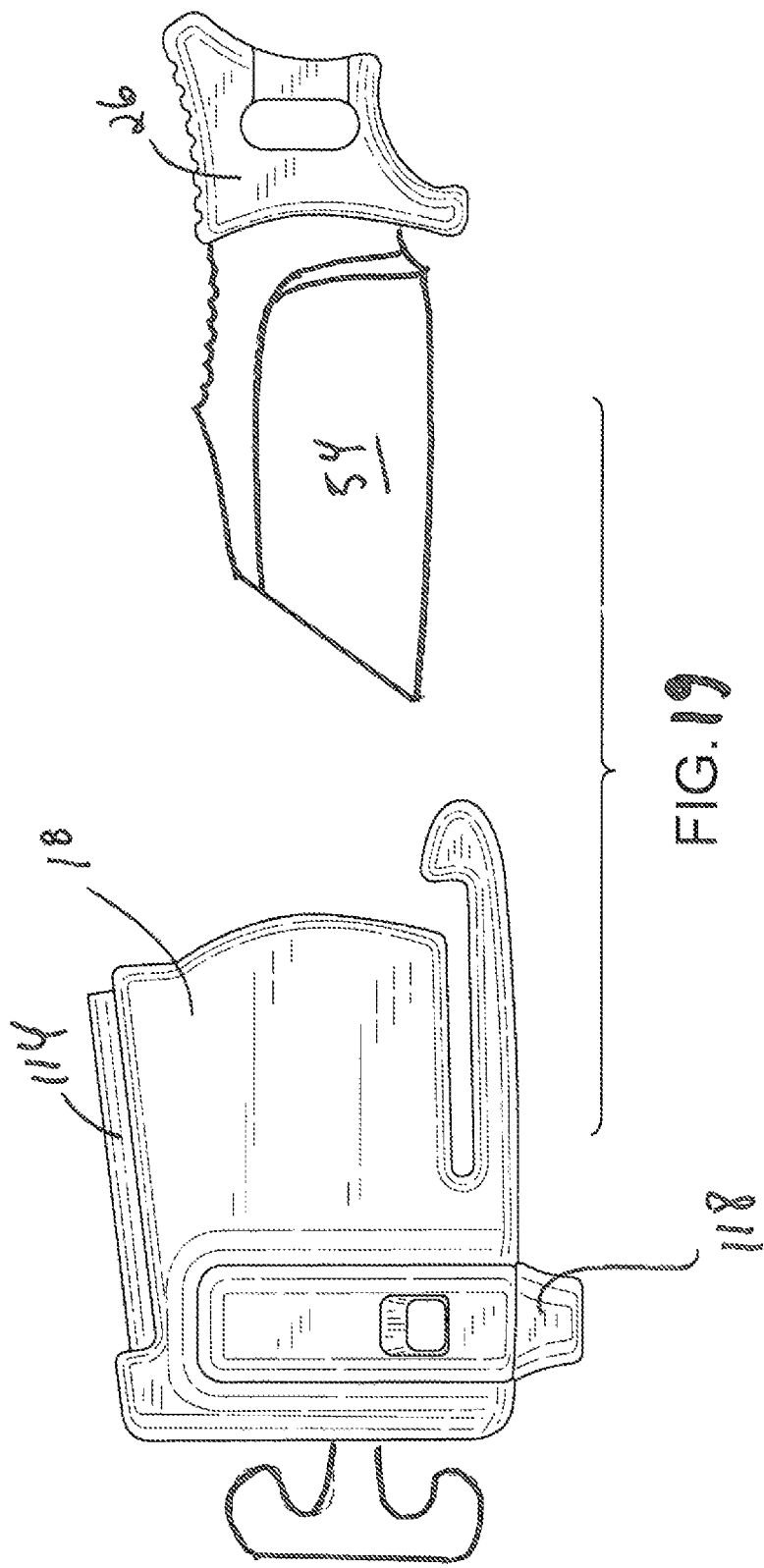
FIG. 19 shows the knife of separated from the sheath.
Figure 20:
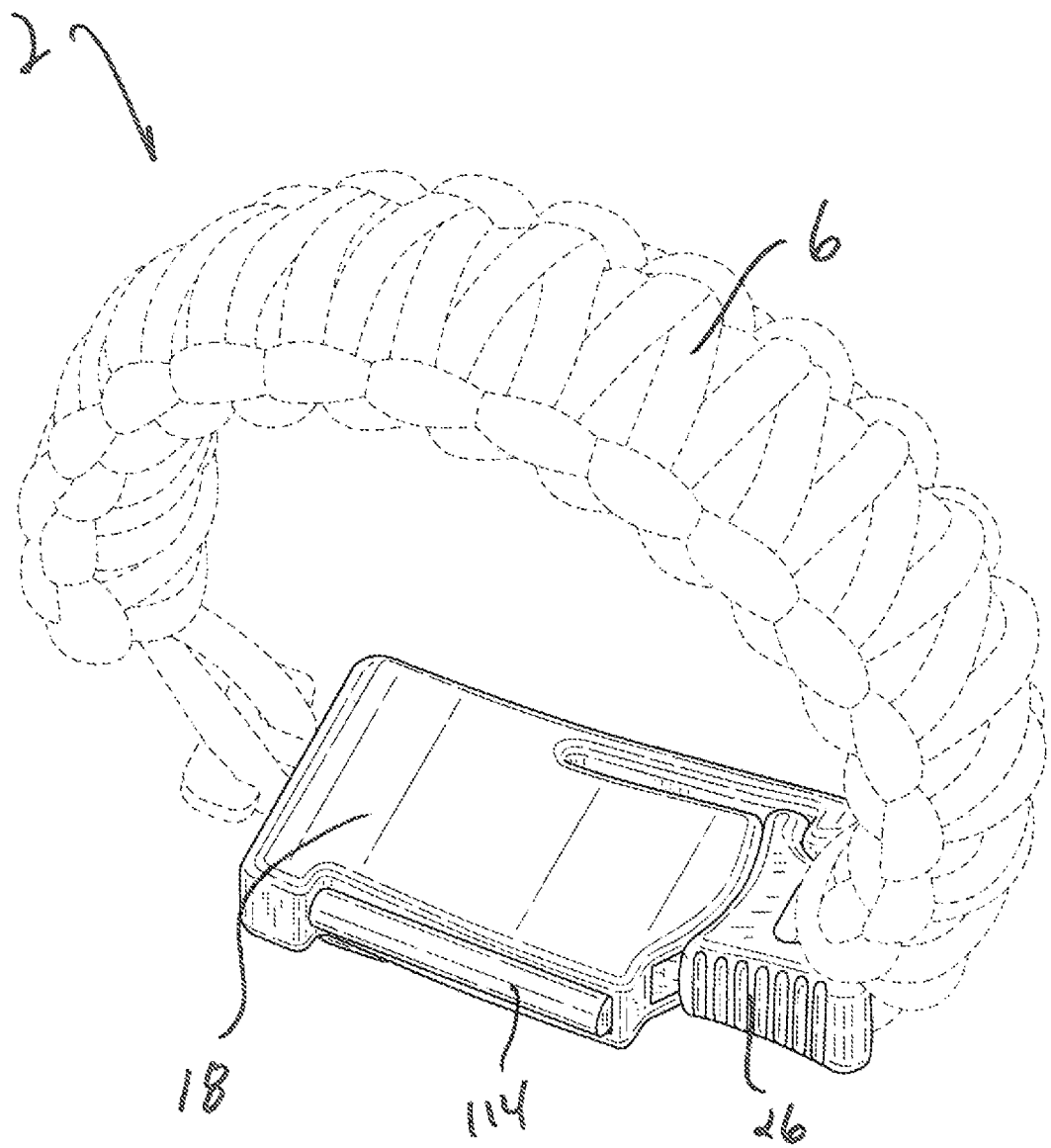
FIG. 20 is a perspective view of the knife and associated sheath interconnected to a bracelet, wherein a portion of the knife is located within the sheath.

FIGS. 15 and 16 show another embodiment of the present invention, wherein a watch 110 incorporated in the flexible band 6. Here the clasp is the knife/sheath combination.

FIGS. 17-20 show another embodiment of the present invention that includes a flint 114 and a whistle 118.

In the examples shown, a paracord flexible band is provided. The paracord terminates in a loop 86 selectively interconnected to the hook 46 on the sheath. The other end of the flexible band is tied or otherwise interconnected to the blade base 26.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. In combination a knife and sheath, comprising:
   a sheath having a first end and a second end with an opening, the sheath also having a selectively deflectable arm extending away from the sheath, the arm having a proximal end interconnected to the sheath between the first end and the second end and a distal end that comprises a detent, the deflectable arm being of such length wherein the detent is located adjacent the second end;
   a knife comprised of a blade extending from a blade base, the blade base having a first end interconnected to the blade and a second end, the blade base also having a protrusion extending from an outer surface of the blade base, wherein the blade is configured to be selectively inserted and removed from said sheath;
   wherein the detent has a first position of use where the blade is inserted within the sheath and the protrusion is positioned between the second end of the sheath and the detent, wherein a curved surface of the detent engages a portion of the protrusion, and a second position of use where the selectively deflectable arm is deflected so at least a portion of the detent is moved relative to the protrusion;
   wherein the opening of the sheath is associated with a cavity configured to selectively receive the blade, the cavity having a ceiling and a floor, wherein a tip of the blade is spaced from the floor when the blade is inserted in the sheath;
   wherein movement of the detent from the first position of use to the second position of use may be achieved by rotating the blade base relative to the sheath to move the tip towards the floor; and
   wherein the sheath employs at least one of a flint and a whistle.

2. The combination of claim 1, wherein at least one of the blade and blade base includes a gripping surface on a top surface thereof.

3. The combination of claim 1, wherein the concaved surface of the detent is configured to selectively receive a corresponding portion of the protrusion when the detent is in the first position of use.

4. The combination of claim 1, wherein the second end of the sheath and the first end of the blade base are comprised of complementary curved surfaces.

5. The combination of claim 1, wherein the sheath includes a compass.

6. The combination of claim 1, wherein the blade comprises a pivot point that selectively engages the ceiling of the sheath when the blade base is rotated relative to the sheath.

7. The combination of claim 1, further comprising a flexible band having a first end operatively interconnected to the first end of the sheath, and a second end operatively interconnected to the second end of the blade base.

8. The combination of claim 7, wherein the flexible band is comprised of at least one of paracord, leather, metal, cloth, rubber, or a similar flexible material.

9. In combination a knife and sheath, comprising:
a sheath having a first end and a second end with an opening, the sheath also having a selectively deflectable arm extending away from the sheath, the selectively deflectable arm having a proximal end interconnected to said sheath between the first end and the second end and a distal end that ends in a detent, wherein the deflectable end is of such length wherein the detent is located adjacent the second end;
a knife comprised of a blade extending from a blade base, the blade base having a first end interconnected to the blade and a second end, the blade base also having a protrusion extending therefrom, wherein the blade is configured to be selectively inserted and removed from said sheath;
wherein the second end of the sheath and the first end of the blade base are comprised of complementary curved surfaces;
wherein the detent has a first position of use where the blade is inserted within the sheath and the protrusion is positioned between the second end of the sheath and the detent and a second position of use where the selectively deflectable arm is deflected so at least a portion of the detent is moved relative to the protrusion;
wherein the detent includes a recessed portion configured to selectively engage and partially surround a corresponding portion of the protrusion when the detent is in the first position of use;
wherein the opening of the sheath is associated with a cavity configured to selectively receive the blade, the cavity having a ceiling and a floor, wherein a tip of the blade is spaced from the floor when the blade is fully inserted in the sheath; and
wherein movement of the detent from the first position of use to the second position of use is achieved by rotating the blade base relative to the sheath to move the tip toward the floor.

10. The combination of claim 9, further comprising a compass, a flint, and a whistle.

11. The combination of claim 9, further comprising a flint and a whistle.

12. The combination of claim 9, further comprising a flexible band having a first end operatively interconnected to the first end of the sheath, and a second end operatively interconnected to the second end of the blade base.

13. The combination of claim 12, wherein the flexible band is made of at least one of paracord, leather, metal, cloth, rubber, or a similar flexible material.

14. The combination of claim 9, wherein the blade comprises a pivot point that selectively engages the ceiling of the sheath when the blade base is rotated relative to the sheath.

15. A selectively connectable assembly, comprising:
a sheath having a first end and a second open end, the sheath including a selectively deflectable arm terminating at a retaining member having a curved surface located adjacent the second open end of the sheath, the selectively deflectable arm extending away from the sheath with a proximal end interconnected to the sheath between the first end and the second open end and a distal end that comprises the retaining member spaced from the second open end of the sheath;
a knife comprised of a blade configured to selectively fit within the sheath and an end with a protrusion extending therefrom, the blade further including a tip;
wherein the retaining member has a first position of use where the protrusion is positioned between the second open end of the sheath and the retaining member, wherein the curved surface engages a portion of the protrusion, and a second position of use where the retaining member is deflected such that the knife is able to move away from of the sheath;
wherein the second open end of the sheath is associated with a cavity configured to selectively receive the blade, the cavity having a ceiling and a floor, wherein the tip of the blade is spaced from the floor when the blade is inserted in the sheath; and
wherein the retaining member will move from the first position of use to the second position of use when the second end of the device is moved to urge the tip towards the floor.

16. The combination of claim 15, further comprising a compass, a flint, and a whistle.

17. The combination of claim 15, further comprising a flint and a whistle.

18. The assembly of claim 15, wherein the second open end of the sheath is arcuate.

19. The assembly of claim 15, further comprising a flexible band having a first end operatively interconnected to the first end of the sheath, and a second end operatively interconnected to the end of the knife.

20. The assembly of claim 19, wherein the flexible band is made of at least one of paracord, leather, metal, cloth, rubber, or similar flexible material.

* * * * *